United States Patent

[11] 3,596,244

[72] Inventor Bernhardt J. Litke
 219 East Blair St., Lyons, Kans. 67554
[21] Appl. No. 714,818
[22] Filed Mar. 21, 1968
[45] Patented July 27, 1971

[54] STOP AND TURN LIGHT SIGNALING SYSTEM
 7 Claims, 1 Drawing Fig.
[52] U.S. Cl. .................................................. 340/67,
 340/72
[51] Int. Cl. .................................................. B60q 1/38,
 B60q 1/44
[50] Field of Search .................................... 340/56, 67,
 72

[56] References Cited
 UNITED STATES PATENTS

| | | | |
|---|---|---|---|
| 2,282,956 | 5/1942 | Falge et al. | 340/83 UX |
| 2,564,145 | 8/1951 | Beall et al. | 340/72 UX |
| 2,669,704 | 2/1954 | Hollins | 340/81 |
| 2,706,808 | 4/1955 | Hollins | 340/81 |
| 3,283,301 | 11/1966 | Beasley | 340/70 X |
| 3,460,089 | 8/1969 | Gregory | 340/67 |
| 3,483,509 | 12/1969 | de Coye de Castelet | 340/81 |

*Primary Examiner* — John W. Caldwell
*Assistant Examiner* — Kenneth N. Leimer
*Attorneys* — Dunlap, Laney, Hessin and Dougherty

ABSTRACT: A visual signaling system for use on motor vehicles to signal stops and turns made by the vehicle. The system is electrical circuitry which includes a battery, and further includes a brake pedal stop light switch, and a turn signal flasher connected in series with the battery, and in parallel with each other. A common selector switch is connected in both the turn signal flasher circuit and the stop light switch circuit to selectively place either of a pair of lights in the stop signal switch circuit, or alternately, another combination of lights in the turn signal flasher circuit. A stop light flasher is connected in series with the stop light switch and in parallel with the turn signal flasher. The stop light flasher is a device which will cause the brake lights to flash on and off when the brake pedal is depressed to close the stop light switch, but will also permit instant lighting of the stop lights at that time. A switching device is provided for automatically inactivating the stop light flasher at such times as the turn signal flasher circuit is closed to energize the turning lights, thus permitting at least one stop light to burn steadily at this time, provided that the brake pedal stop light switch is closed. A second switching device for manually accomplishing the same purpose may also be provided.

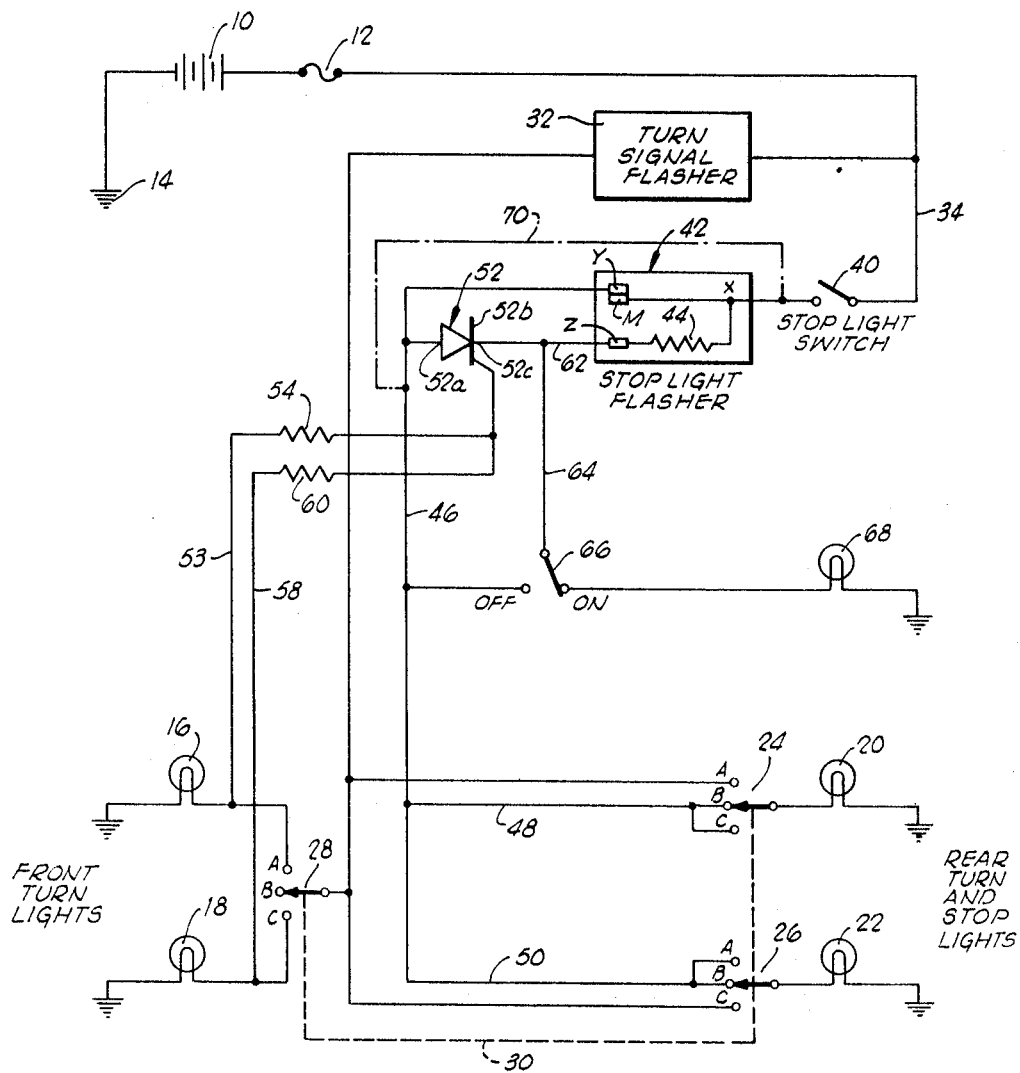

STOP AND TURN LIGHT SIGNALING SYSTEM

BACKGROUND OF THE INVENTION

1. Field of the Invention

This invention relates to visual signaling systems for use on motor vehicles. More particularly, the present invention relates to the electrical circuitry utilized for intermittently illuminating the stop and turn signal lights of automobiles to apprise other drivers or pedestrians of certain maneuvers about to be undertaken by the driver of the signaling automobile.

2. Brief Description of the Prior Art

It has been generally recognized that it is desirable to provide visual signaling devices at the front and rear of automobiles for the purpose of apprising drivers of other motor vehicles, and also pedestrians, of the intentions of the operator of the automobile with respect to braking or decelerating the automobile, and with respect to turning the automobile from a directly forward course of movement. To this end, most modern automobiles are provided with one or more brake lights which are illuminated when the driver applies the brakes of the automobile, and are provided with at least two turning signal lamps which are individually illuminated at such time as the driver of the automobile is preparing to turn either to the right or the left from the course being followed. A practice which has become conventional is to provide a flashing device in the electrical circuit to the turn signals of the automobile in order to cause the turning lights to blink on and off at such time as a turn is to be made. The most widespread mode of operation of the brake lights is to cause these lights to be illuminated when the brakes are applied, and to remain steadily illuminated until the brakes are released.

Automotive engineers and safety experts have previously recognized that the provision of brake lights which burn steadily when the brakes are applied is a less desirable arrangement, from many considerations, than those arrangements in which the brake lights are made to flash or blink on and off intermittently during the application of the brakes. The advantage of the latter system is based primarily in the fact that a person's attention to the deceleration of the automobile ahead can be gained better by flashing lights than by a steadily burning light. A problem which must be confronted in the provision of flashing or blinking brake lights, however, is that of continuing to provide a mode of operation for the turning lights which is distinctive from the mode of operation of the brake lights. This is particularly necessary since there are many times when both systems will be in simultaneous operation, that is, a turn will be signaled at the same time that the brakes are being applied.

Although some efforts have previously been made to design electrical systems which will permit the brake lights to flash intermittently at all times except those times at which turn signals are being utilized and are flashing intermittently, many of these systems have drawbacks or disadvantages which offset the advantage of having the brake lights flash in the manner described. In some instances, the type of flasher that must be used in the electrical circuitry to cause the brake lights to flash on and off is sensitive to load changes. Thus, attempts to connect trailers and other towed vehicles behind the motor vehicle carrying this type of flashing brake light circuitry will result in unsatisfactory operation of the system due to overloading of the circuitry when the running lights or brake lights carried on the trailer or tow are connected to, and overload, the light circuitry in the towing vehicle. Another factor which has led to lack of acceptance of the proposed flashing brake light systems is the failure of such systems to lend themselves to simple and inexpensive incorporation in the existing electrical circuitry on vehicles presently in use. Stated differently, the changes in the electrical circuitry of the vehicle which are required in order to incorporate the flashing brake light systems is too costly to permit widespread acceptance.

Among some of the proposals for systems which provide for the inclusion in the signaling system of brake lights which flash on and off intermittently at the time that the brakes are applied may be mentioned those disclosed in U.S. Pats. Nos. 2,706,809, 2,669,704 and 2,846,665 to J. R. Hollins, U.S. Pats. Nos. 2,835,880 and 2,957,161 to C. R. Daws, U.S. Pat. No. 2,854,649 to B. A. Bosher, and U.S. Pat. No. 2,321,803 to R. N. Falge et al.

Brief Description of the Present Invention

The present invention provides a visual signaling system for use on motor vehicles for signaling turns and deceleration of the vehicle by means of flashing lights, with such signaling being accomplished in a manner which avoids confusion of other drivers observing the signals. The system is relatively simple and inexpensive in construction, can be easily installed on motor vehicles already having conventional visual signaling systems, and is not adversely affected by the imposition of additional electrical loads on the circuitry, as a result, for example, of the connection thereto of signal lights carried by a trailer or other towed vehicle.

Broadly described, the present invention comprises a plurality of signal lights adapted for mounting on a motor vehicle, and including at least two lights disposed at opposite sides of the vehicle for signaling turns of the vehicle toward the respective sides, a battery or other suitable source of electrical power, and electrical circuitry interconnecting the battery and lights, the electrical circuitry including first means for flashing signal lights located only at one of the sides of the vehicle at a time when a turn signal switch is closed, and second means for flashing two of the lights at a time when the brakes of the vehicle are applied, and said turn signal switch is open. The electrical circuitry which interconnects the power source and lights can be more specifically described as including two parallel circuits, one of which may be termed the turning signal circuit, and the other of which may be termed the stop signal circuit. Cooperating with the two circuits is a turning signal switch which is used to alternately connect either of these parallel circuits to selected lights mounted on the motor vehicle.

Included in the turn signal circuit is a turn signal flasher. The stop signal circuit includes a stop light switch, a stop light flasher device and means for automatically deactivating the stop light flasher device when the turn signal circuit is closed for the purpose of signaling a turn. The stop light flasher is a type which will initially and immediately light those lights serving as stop or deceleration lights the instant the stop light switch is closed, provided that the turn signal circuit is not at that time closed. The stop light flasher device preferably includes a pilot light which, in addition to its required function as a ballast load or resistor, apprises the vehicle operator of the vehicle that the stop or deceleration lights are flashing. The circuitry of the invention further includes switch means for manually completely deactivating the stop light flasher at the will of the motor vehicle operator.

The described visual signaling system of the invention permits a number of important objectives of the invention to be achieved. Among these may be cited:

*a* the brake or deceleration lights are made to flash instead of burn steadily at such times as a turning movement is not being signaled and the vehicle brakes are applied;

*b* the brake lights are illuminated instantly when the brakes are applied;

*c* the flashing of the brake lights is automatically terminated at such time as a turning signal is energized.

*d* the visual signaling system of the invention can be quickly and easily installed on vehicles now in use and having conventional signaling systems.

*e* the signaling system of the invention will continue to operate satisfactorily even though the electrical load on it is changed, as a result, for example, of connecting the lights carried by trailers or other towed vehicles into the circuitry.

In addition to the foregoing described objects and advantages of the invention, additional objects and advantages will become apparent as the following detailed description of the invention is read in conjunction with the accompanying drawings.

BRIEF DESCRIPTION OF THE DRAWINGS

The sole drawing is a circuit diagram depicting the improved stop and turn light circuitry of the present invention.

DETAILED DESCRIPTION OF A PREFERRED EMBODIMENT OF THE INVENTION

Referring to the drawing, reference numeral 10 designates a source of electrical current, such as the storage battery conventionally employed in motor vehicles. A suitable fuse 12 may be included in the circuitry in series with the battery. As is conventional practice in the electrical circuitry utilized in motor vehicles, one side of the battery 10 may be grounded as indicated by the ground 14. As is the usual construction on automobiles and the like, a pair of front signal lights 16 and 18 are provided in addition to a pair of rear signal lights 20 and 22. For purposes of description, the front signal light 16 will be assumed to be located on the right side of the motor vehicle, and the front signal light 18 will be assumed to be located on the left side of the motor vehicle. In like manner, the rear signal lights 20 and 22 will be assumed to be located at the right rear and left rear of the vehicle, respectively. Associated with the respective rear signal lights 20 and 22 are a pair of three position switches 24 and 26, respectively, each of these switches having contacts A, B and C. Associated with the front signal lights 16 and 18 is a three position switch 28 also having contacts A, B and C. The switches 24, 26 and 28 are mechanically interconnected for simultaneous switching movement, with such mechanical interconnection being indicated by the dashed line 30. Each of the signal lights 16, 18, 20 and 22 has a grounded connection as indicated by the ground symbols connected to each of the lights.

Connected between the positive terminal of the battery 10 and the contact B of switch 28, as well as between the battery and the contacts A and C, respectively, of switches 24 and 26 is a turn signal flasher device 32. Turn signal flasher devices suitable for use in the circuitry of the present invention, and indicated by reference numeral 32 in the drawing, are well known in the art, and function to cause on and off flashing of the lights to which the circuit device is connected when a circuit is made to the lights through the turn signal flasher device. Connected in parallel with the turn signal flasher 32 by means of electrical lead 34 is a stop light switch 40 which is associated with the brake pedal of the automobile (not shown) in a way which permits the stop light switch to be closed when the brake is depressed.

Also connected in parallel with the turn signal flasher 32, and in series with the stop light switch 40 is a stop light alternating flasher device designated generally by reference character 42. The stop light flasher 42 includes a first contact or terminal X, and in addition, includes fixed contacts Y and Z and movable contact M. The contact X is connected to the stop light switch 40, and to the movable contact M. It is also connected through a heater resistance coil 44 to the contact Z. The contact Y is connected by electrical leads 46, 48 and 50 to the contacts B on the three-position switches 24 and 26.

Connected between the contact Y and the contact Z of the stop light flasher device 42 is a silicon controlled rectifier 52. The silicon controlled rectifier 52 functions as a remotely controlled switch in a manner hereinafter described, and has an anode 52a, a cathode 52c and a gate 52b. The gate 52b is connected by an electrical lead 53 containing a resistor 54 to the hot lead to the right front signal light 16. A second lead 58 contains a resistor 60 and is connected to the gate 52b of the silicon controlled rectifier 52 and to the left front signal light 18. Extending from the lead 62 which connects the silicon controlled rectifier 52 to the contact Z of the stop light flasher 42 is an electrical lead 64 which extends through a manual, single pole, double throw, ON-OFF switch 66 and a pilot light 68 to ground.

Operation

The operation of the improved signaling system of the invention may perhaps be best and most clearly described by initially explaining the appearance and function of a conventional electrical circuit used on motor vehicles for illuminating, at different times, the lights which are provided thereon for purposes of indicating a turn and for indicating deceleration of the vehicle. If a broken line, indicated by the reference numeral 70, is placed on the drawing to represent an electrical conductor extended from the stop light switch 40 to the lead 46 which connects the stop light flasher 42 to the three-way switches 24 and 26, a circuit which includes this lead 70 will be substantially the type of circuitry utilized in a typical motor vehicle signaling system. The circuit as thus simplified includes the battery 10, the fuse 12, the turn signal flasher 32, the stop light switch 40, the three-way switches 24, 26 and 28, and the signal lights 16, 18, 20 and 22.

When this typical signaling system is employed, the operator of the vehicle will normally use this circuit in any one of three different statuses. Thus, when the brake pedal is not in use and the stop light switch 40 is open, and when the turn signal indicator lever arm (not shown), usually located on the steering column of the automobile, is in its neutral or centralized position so that the three-way switches 24, 26 and 28 are positioned with their movable member touching the contacts B, the signal lights 16, 18, 20 and 22 are all darkened and no signaling function is being performed by the circuitry.

At such time as the operator of the vehicle depresses the brake pedal to decelerate or stop the vehicle, the stop light switch 40 is closed and a circuit is made through the lead 70 and the lead 46 to the contacts B of the three position switches 24 and 26. This results in a steady flow of current to the signal lights 20 and 22 located at the rear of the vehicle so that they apprise a following vehicle operator, by means of a steady light, that the vehicle is decelerating or stopping.

At such time as the vehicle operator may desire to signal a turning movement of the vehicle, the turn signal lever mounted on the steering post of the automobile is moved to either a right turn or a left turn position, which movement effectively shifts the mechanical linkage 30 so as to move the switches 24, 26 and 28 to close either the A or the C contacts of each, depending upon whether a right hand turn or a left hand turn is to be made. With the shifting of the movable member of the switches 24, 26 and 28 to a position in which the C contacts are closed, the signal lights 18 and 22 will be placed in a circuit which includes the turn signal flasher 32, and the result is that these two lights will flash to indicate to a following vehicle that the vehicle is turning to the left. Alternatively, if the turn lever on the steering post is moved in the opposite direction to indicate a right turn, the movable member of the switches 24, 26 and 28 is shifted so that the contact A of each of these switches is closed, and the signal lights 16 and 20 are flashed by the automatic operation of the turn signal flasher 32. When either a right turn is being signaled by the lights 16 and 20, or a left turn by the lights 18 and 22, the other rear light 22 or 20, as the case may be, will be steadily illuminated when the stop light switch 40 is closed, thus indicating application of the brakes to decelerate the vehicle during the turning movement.

Before departing from the discussion of the conventional signaling system represented by the circuit which is formed when the electrical lead 70 is included in the circuit diagram shown in FIG. 1, and when all of that portion of the illustrated circuitry bypassed by this lead and connected in parallel therewith is omitted, it may be seen that the circuit of the present invention can be easily installed in existing or conventional signaling circuitry of the type now in use on most automobiles. It will be perceived that, in the conventional circuit, the stop light switch 40 has two wires or leads, the one running to the fuse block 12 and power source 10, and the other typically extending, as indicated by the electrical lead 70, to the three position switches 24 and 26 which control the illumination of the lights 20 and 22. To install the system of the present invention, it is only necessary to break the wire running from the stop light switch 40 to the switches 24 and 26, and insert the remaining elements of circuitry in the circuit between the stop light switch and the lead 46. This will entail, of course, the connection of the leads 53 and 58 which contain the resistors 54 and 60, respectively, to the hot leads connected to the front turn signals 16 and 18.

In utilizing the signaling system of the present invention, the illustrated circuitry is in the status it occupies when no maneuver is to be signaled to following or preceding vehicles. Thus, the brake is not being applied, and therefore the stop light switch 40 is open. Also, the turn signal lever (not shown) on the steering column is in its neutral or centralized position and no turn signal is being given.

If the vehicle is to be stopped or decelerated, the brake is applied to close the stop light switch 40. This instantaneously makes a circuit through contacts Y and M of the stop light flasher device 42, and through the B contacts of three position switches 24 and 26 to the rear signal lights 20 and 22. Both these lights are thus illuminated substantially simultaneously with the application of the brakes.

The stop light flasher device 42 now functions to cause the rear signal lights to simultaneously and in synchronism flash on or off. The instant the stop light switch 40 is closed, a small amount of current flows through the heater resistance coil 44, the manual ON-OFF switch 66, and the pilot light 68 to ground. The current passed is sufficient to cause the heater resistance coil to heat up and change its dimension, but is insufficient to light the pilot light 68, which is located on the vehicle dashboard, or other convenient location in view of the driver. The changing of the dimension of the heater resistance coil 68 causes the movable contact M to move away from contact Y and to ultimately touch contact Z. When this occurs, the lights 20 and 22 are darkened, the coil 44 is shorted out, and full current flows through the pilot light 68 to cause it to be lighted. Shorting out of the heater resistance coil 44 permits it to commence to cool, and this in turn allows it to undergo a change in dimension which will ultimately allow the contact M to return to the position illustrated in the drawing in which it touches contact Y. The rear lights 20 and 22 are thus again illuminated. This cycle is automatically repeated at a rapid rate so that the effect is to produce on-off flashing of both the rear lights 20 and 22, and of the pilot light 68. The latter light will permit the operator to be apprised of the fact that the rear lights 20 and 22 are flashing as the brakes are applied.

Assuming now that the brakes are not being applied, but that it is desired to signal a turn, say to the right. The turn signal lever on the steering post is manually shifted to the appropriate position for signaling this turn, and this action moves the mechanical linkage 30 in the manner required to shift switches 24, 26 and 28 to positions in which the movable elements of all three switches touch the contacts A of each of the three switches. This causes a circuit to be made through the turn signal flasher 32 to the lights 16 and 20. The stop signal circuit to the light 22 remains open as long as the stop light switch 40 is open (that is, the brakes are not being applied). The turn signal flasher 32 causes lights 16 and 20 to flash on and off intermittently to indicate a turn to the right. This will continue until the turn signal lever is returned to the neutral position.

If, as is frequently the case, it is desirable or necessary to decelerate the vehicle while negotiating the turn, such deceleration should be signaled in addition to the signaling of the turn, but in a manner such that a following vehicle operator is not confused by the duality of the signal. To avoid such confusion, it is desirable that the light 22 not being utilized to signal the right turn be caused to burn steadily in order to indicate deceleration, rather than to flash on and off. To this end, the silicon controlled rectifier 52 is provided. With the silicon controlled rectifier connected in the circuit in the manner illustrated, the application of a small current to the gate 52b of the silicon controlled rectifier effects a change of status in the rectifier to permit current to flow through the circuit connected to the cathode 52c and the anode 52a of the rectifier. The current will continue to flow through the rectifier, even when a signal is no longer applied to the gate 52b, provided that such current flow is continuous. If, then, however, current flow through the rectifier is terminated, it cannot again be commenced until the signal (current) is applied again to the gate 52b. With the circuitry arranged as shown in the accompanying drawing, the silicon controlled rectifier 52 is connected between the contact Y and the contact Z of the stop light flasher 42, although in alternative embodiments of the invention, the rectifier may be connected between the contacts X and Z, or between the contacts X and Y. The illustrated arrangement is preferred, however, in that with this type of connection, the silicon controlled rectifier operates cooler.

When the brake pedal is depressed to close the stop light switch 40, and when no turn signal is being given, rear signal lights 20 and 22 will flash as previously described and will continue to flash as long as the brake pedal remains depressed. At such time, however, as the turn signal lever on the steering post is moved to a position such that the three-position switches 24, 26 and 28 are thrown to signal a turn to the right or left, as previously described, current is delivered to either the light 16 or the light 18, depending upon which direction the turn is to be made. With the application of this current to one of these lights, a current will flow through either the electrical lead 53 or 58, and the respective resistor 54 or 60 to the gate 52b of the silicon controlled rectifier 52. The application of this signal to the gate 52b will permit current to flow from the contact Y of the stop light flasher 42 through the silicon controlled rectifier 52, through the switch 66, through the pilot light 68 to ground. Thus, the heater resistance coil 44 will be shorted out, and insufficient current will thus be passed through this coil to permit it to undergo the heating up and change in dimension necessary to cause the alternating or shifting movement of the movable contact M between the fixed contacts Y and Z. The stop light flasher 42 is thus deactivated, and the effect is that that one of the rear lights 20 or 22 which is not being used to indicate a turning signal will be steadily illuminated, rather than flashing ON and OFF.

The rear stop light will continue to burn steadily as long as the brake pedal is being depressed, even though during the course of execution of the turn, the turn lights are flashing on and off due to the passage of current to them in an intermittent or periodic fashion due to the inclusion of the turn signal flasher 32 in their circuits. The momentary or periodic interruption of current flow to the lights being used to signal the turn does not result in an interruption of current flow through, or the conductivity of, the silicon controlled rectifier 52 since, as previously explained, once current is permitted to flow through this device, the gate 52b thereof may have the signal removed therefrom without loss of conductivity of the rectifier so long as the current flow therethrough remains continuous.

As long as the switches 24, 26 and 28 continue to be properly positioned for indicating a turn, the gate 52b of the silicon controlled rectifier 52 will continue to receive current, so that this device will continue to permit the heater resistance coil 44 to be shorted out. Thus, at any time that there is being simultaneously executed a turn and a deceleration of the automobile the turn will be indicated by flashing lights located on one side of the automobile and at the forward and rear ends thereof, and the deceleration or stopping movement will be indicated by a steadily illuminated light located on the opposite rear side of the automobile from the flashing turn signal light at the rear of the automobile. It may be pointed out that the resistors 54 and 60 function to isolate the left and right front turn lights from the reminder of the system, and also to reduce the total amount of current applied to the gate 52b of the silicon controlled rectifier 52. It may also be conveniently pointed out here that an alternate connection is possible for the gate circuit of the silicon controlled rectifier 52. Thus, in those automobiles which are equipped with pilot turning lights which flash ON and OFF on the dash panel of the automobile at such time as the turn is being executed, the wires leading to the gate 52b may be connected to these lights or their particular circuitry, instead of to the actual turning lights 16 and 18 located at the front of the automobile. The same is true of lower priced automobiles in which only one pilot light is provided on the dash panel for signaling by a flashing light, the fact that a turn is being made in either direction. In this case, a single lead would be used to connect the gate 52b to this pilot light.

There will be occasional instances where it may be desirable to have the rear signal lights 20 and 22 burn steadily when the brakes of the automobile are applied, rather than flash in the manner which normally occurs when there is no turn signal being given. Deactivation of the flashing device in the stop signal circuit is accomplished with the present invention by the inclusion in the circuit illustrated in the drawings of the ON-OFF switch 66. This single pole, double throw switch can be manually operated to effectively short the heater resistance coil 44 of the stop light flasher 42, and thus render the flasher inoperative. Thus, by connecting this switch between the contact Z and the pilot light 68 through the ON contact of the switch, sufficient current is conducted through the heater resistance coil 44 of the stop light flasher 42 to permit the flasher to operate normally, and to cause the rear signal lights 20 and 22 to flash when the brake pedal is depressed to close the stop light switch 40. Should the operator, however, desire to cancel the flashing characteristic of the lights 20 and 22, he may throw the switch 66 to its OFF position. The pilot light 68 is thereby removed from the circuit, and the switch 66 functions to short circuit the heater resistance coil 44 across the terminals Y and Z in substantially the same manner that the silicon controlled rectifier 52 functions to short the heater resistance coil.

From the foregoing description of the invention, it will have become apparent that the present invention entails a simple electrical circuit which yet provides a number of advantages in a visual signaling system for use on motor vehicles. Thus, the system prevents the occurrence of confusion of following drivers as to the intent of the driver of the motor vehicle incorporating the invention relative to turns and decelerating actions. Moreover, there is no time lag occurring between application of the brakes and the time that the braking signal is energized. The system may be quickly and easily installed on existing vehicles with a minimum of modification necessary.

Although a preferred embodiment of the invention has been herein described, it will be understood that various changes and modifications to the preferred circuitry illustrated in the drawings herein described can be effected without departure from the basic principles of the invention. Changes and innovations of this type are therefore deemed to be circumscribed by the spirit and scope of the invention.

What I claim is:

1. A visual signaling system for a motor vehicle comprising:
   a plurality of brake-turn lights comprising at least one light adapted to be mounted on each of the opposite sides of said vehicle at the rear portion thereof;
   additional flashing lights mounted on said vehicle;
   a source of electrical power;
   electrical circuitry interconnecting said power source and said brake-turn lights and said additional flashing lights, said electrical circuitry comprising:
   a turn signal circuit having a turn signal flasher device therein for automatically opening and closing said turn signal circuit after manual actuation of said turn signal flasher device;
   a stop signal circuit connected to said power source in parallel with said turn signal circuit and including a brake actuated stop light switch therein, and further having a stop signal flasher device therein for automatically opening and closing said stop signal circuit when said brake actuated stop light switch is closed;
   a turn signal switch for alternately connecting and disconnecting said additional flashing lights to said turn signal circuit;
   additional switches associated with each of said brake-turn lights for alternately connecting each of said brake-turn lights either in said stop signal circuit or in said turn signal circuit;
   means interconnecting said turn signal switch and additional switches for simultaneous movement to concurrently connect one of said brake-turn lights and one of said additional flashing lights on one side of said vehicle to said turn signal circuit, and one of said brake-turn lights on the opposite side of said vehicle to said stop signal circuit, and alternately, to disconnect said additional flashing lights from said turn signal circuit when said brake-turn lights are both connected to said stop signal circuit; and
   means connected to said turn signal circuit for energization by current flowing in said turn signal circuit, and connected in said stop signal circuit for deactivating said stop signal flasher device and permitting current to continuously flow in said stop signal circuit through said deactivated stop signal flasher device when said stop light switch is closed and said turn signal circuit is closed.

2. A visual signaling system as defined in claim 1 wherein said stop signal flasher device is a normally closed, alternating switching device comprising:
   a first contact connected to said stop light switch;
   a second contact connected to said additional switches to facilitate connection of said stop signal circuit through said additional switches to selected ones of said brake-turn lights;
   a resistance heater element;
   a third contact connected through said resistance heater element to said first contact and in parallel with said second contact;
   a movable fourth contact connected to said first contact, and normally contacting said second contact, said fourth contact being movable in response to heating of said resistance heater element to contact said third contact and short said resistance heater element whereby said heater element can then cool, and said movable fourth contact can return to its position in which it contacts said second contact.

3. A visual signaling system as defined in claim 2 and further characterized to include a pilot light connected between said third contact and ground and illuminable when said resistance heater element is shorted by contact between said third and fourth contacts.

4. A visual signaling system as defined in claim 2 wherein said means for deactivating said stop signal flasher device comprises a device for automatically short circuiting said resistance heater element when said turn signal circuit is connected to one of said additional flashing lights to energize said light.

5. A visual signaling system as defined in claim 4 wherein said short circuiting device comprises a silicon controlled rectifier having a cathode connected to said third contact, an anode connected to said second contact, and a gate connected to said additional flashing lights which are alternately connected to said turn signal circuit by said turn signal switch.

6. A visual signaling system as defined in claim 5 and further characterized as including an additional switching device connected between said second and third contacts for short circuiting said resistance heater element to deenergize said stop signal flasher device at any time desired, and regardless of the status of the turn signal circuit, by closure of said additional switching device.

7. A visual signaling system as defined in claim 1 and further characterized as including an additional switching device connected in said stop signal circuit for deenergizing said stop signal flasher device at any time desired and regardless of the status of the turn signal circuit.